United States Patent
Miyaki et al.

(10) Patent No.: US 12,278,399 B2
(45) Date of Patent: Apr. 15, 2025

(54) SOLID-STATE BATTERY

(71) Applicant: Murata Manufacturing Co., Ltd., Nagaokakyo (JP)

(72) Inventors: Yukio Miyaki, Nagaokakyo (JP); Makoto Yoshioka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 478 days.

(21) Appl. No.: 17/716,235

(22) Filed: Apr. 8, 2022

(65) Prior Publication Data

US 2022/0231389 A1 Jul. 21, 2022

Related U.S. Application Data (63) Continuation of application No. PCT/JP2020/035565, filed on Sep. 18, 2020.

(30) Foreign Application Priority Data

Oct. 11, 2019 (JP) .................................. 2019-187901

(51) Int. Cl.
*H01M 50/562* (2021.01)
*H01M 10/0525* (2010.01)
*H01M 10/054* (2010.01)
*H01M 50/545* (2021.01)
*H01M 50/548* (2021.01)

(52) U.S. Cl.
CPC ..... *H01M 50/562* (2021.01); *H01M 10/0525* (2013.01); *H01M 10/054* (2013.01); *H01M 50/545* (2021.01); *H01M 50/548* (2021.01)

(58) Field of Classification Search
None
See application file for complete search history.

(56) References Cited

U.S. PATENT DOCUMENTS

| 7,648,537 B2 | 1/2010 | Harada et al. |
| 7,901,468 B2 | 3/2011 | Harada et al. |
| 2006/0073388 A1 | 4/2006 | Harada et al. |
| 2010/0062343 A1 | 3/2010 | Harada et al. |

(Continued)

FOREIGN PATENT DOCUMENTS

| CN | 1755975 A | 4/2006 |
| JP | H06275247 A | 9/1994 |

(Continued)

OTHER PUBLICATIONS

International Search Report in PCT/JP2020/035565, mailed Dec. 15, 2020, 4 pages.

*Primary Examiner* — Alix E Eggerding
(74) *Attorney, Agent, or Firm* — ArentFox Schiff LLP (57) ABSTRACT

A solid-state battery that includes: a solid battery laminate including a battery constituent unit including a positive electrode layer, a negative electrode layer, and a solid electrolyte interposed at least between the positive electrode layer and the negative electrode layer; a positive-electrode-side external electrode electrically connected to the positive electrode layer, the positive-electrode-side external electrode including at least one element selected from the group consisting of Cu, Ag, Ni, Ti, Cr, Pt, and Pd; and a negative-electrode-side external electrode electrically connected to the negative electrode layer.

15 Claims, 6 Drawing Sheets

(56) References Cited

U.S. PATENT DOCUMENTS

| | | | |
|---|---|---|---|
| 2010/0075219 A1 | 3/2010 | Iwaya et al. | |
| 2012/0171549 A1* | 7/2012 | Ouchi | H01M 4/66 |
| | | | 429/247 |
| 2013/0017435 A1* | 1/2013 | Sato | H01M 10/0585 |
| | | | 429/223 |
| 2019/0252727 A1 | 8/2019 | Shimizu et al. | |
| 2020/0365935 A1 | 11/2020 | Yano et al. | |
| 2021/0351435 A1* | 11/2021 | Koga | H01G 11/06 |

FOREIGN PATENT DOCUMENTS

| | | | |
|---|---|---|---|
| JP | 2005078985 A | 3/2005 | |
| JP | 2009181905 A | 8/2009 | |
| JP | 2011198692 A | 10/2011 | |
| JP | 2017183052 A | 10/2017 | |
| WO | 2008099508 A1 | 8/2008 | |
| WO | 2018092370 A1 | 5/2018 | |
| WO | 2019139070 A1 | 7/2019 | |

* cited by examiner

SOLID-STATE BATTERY

CROSS REFERENCE TO RELATED APPLICATIONS

The present application is a continuation of International application No. PCT/JP2020/035565, filed Sep. 18, 2020, which claims priority to Japanese Patent Application No. 2019-187901, filed Oct. 11, 2019, the entire contents of each of which are incorporated herein by reference.

FIELD OF THE INVENTION

The present invention relates to a solid-state battery. More specifically, the present invention relates to a solid-state battery in which a plurality of layers are composed of a sintered body.

BACKGROUND OF THE INVENTION

Conventionally, secondary batteries that can be repeatedly charged and discharged have been used for various purposes. For example, secondary batteries are used as a power source of an electronic device such as a smartphone and a notebook computer.

In a secondary battery, a liquid electrolyte is generally used as a medium for ion transfer that contributes to charge and discharge. That is, a so-called "electrolytic solution" is used for the secondary battery. However, in such a secondary battery, safety is generally required from the viewpoint of preventing leakage of the electrolytic solution. In addition, an organic solvent or the like used for the electrolytic solution is a flammable substance, and therefore safety is also required in that regard.

Therefore, a solid-state battery with a solid electrolyte instead of an electrolytic solution has been investigated.

Patent Document 1: Japanese Patent Application Laid-Open No. 2009-181905
Patent Document 2: Japanese Patent Application Laid-Open No. 2017-183052
Patent Document 3: Japanese Patent Application Laid-Open No. 2011-198692
Patent Document 4: WO 2008/099508 A

SUMMARY OF THE INVENTION

The solid-state battery generally has a solid battery laminate including a positive electrode layer, a negative electrode layer, and a solid electrolyte therebetween (refer to Patent Documents 1 to 4 described above). In the solid battery laminate, for example, as disclosed in Patent Documents 1 to 3 described above, the electrodes of the positive electrode layer and the negative electrode layer often include a current collector layer and/or a current collector (hereinafter, simply referred to as a "current collector layer"). Whereas, for such a solid battery laminate, there is also a solid-state battery with a "current collection less" structure in which an electrode layer does not include a current collector layer (Patent Document 4 described above).

Figure 1:
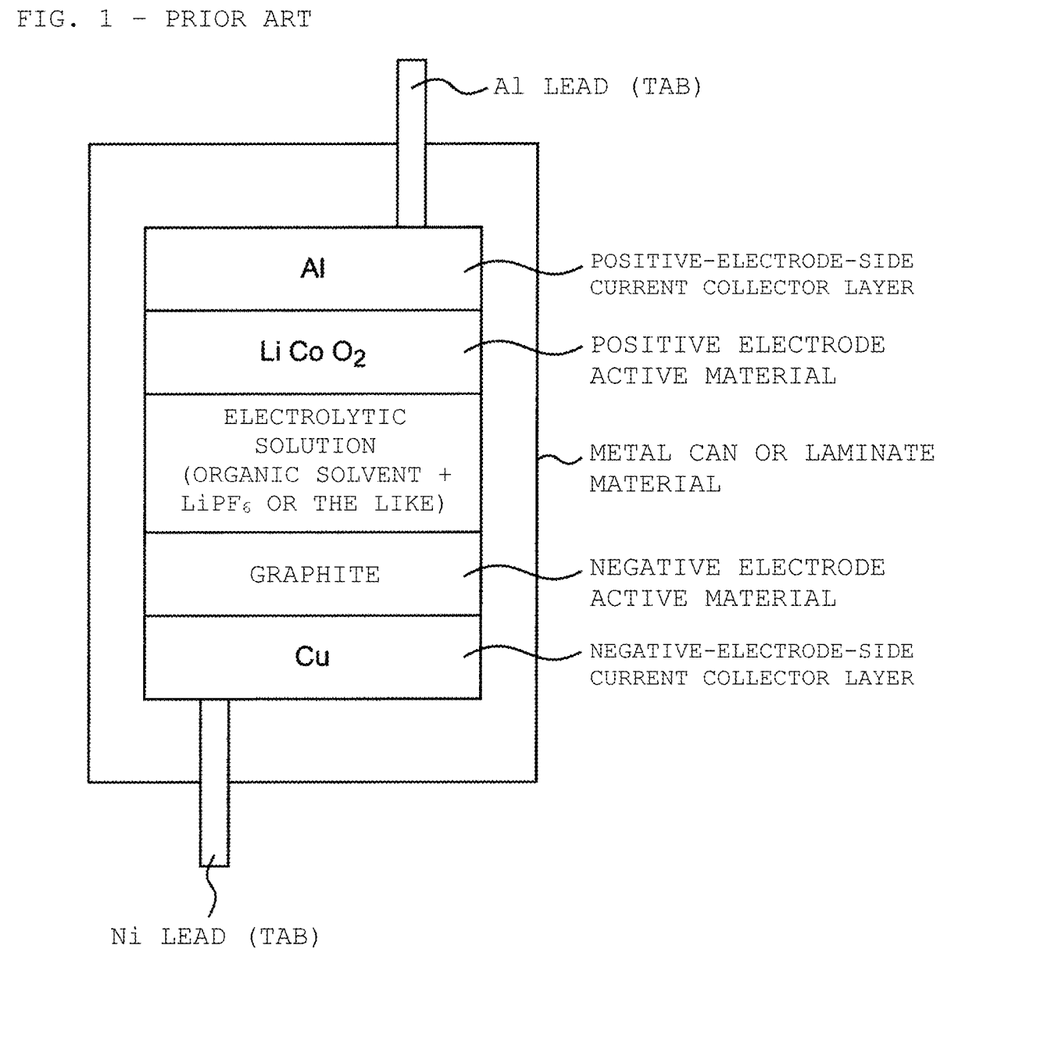
FIG. 1 is a conceptual view schematically illustrating one embodiment (an "appropriate" form functioning as a battery) of a conventional secondary battery.

Herein, for an electrode, particularly a positive electrode, for example, as schematically shown in FIG. 1, in a widely used secondary battery (for example, a lithium ion secondary battery) using a conventional "electrolytic solution" (for example, an organic solvent and an electrolyte such as $LiPF_6$ are included), an aluminum foil (Al) is used as a positive-electrode-side current collector layer (or a conductive material), and a copper foil (Cu) is used as a negative-electrode-side current collector layer (or a conductive material). It is well known in the art that such a current collector layer successfully functions in a secondary battery.

Figure 2:
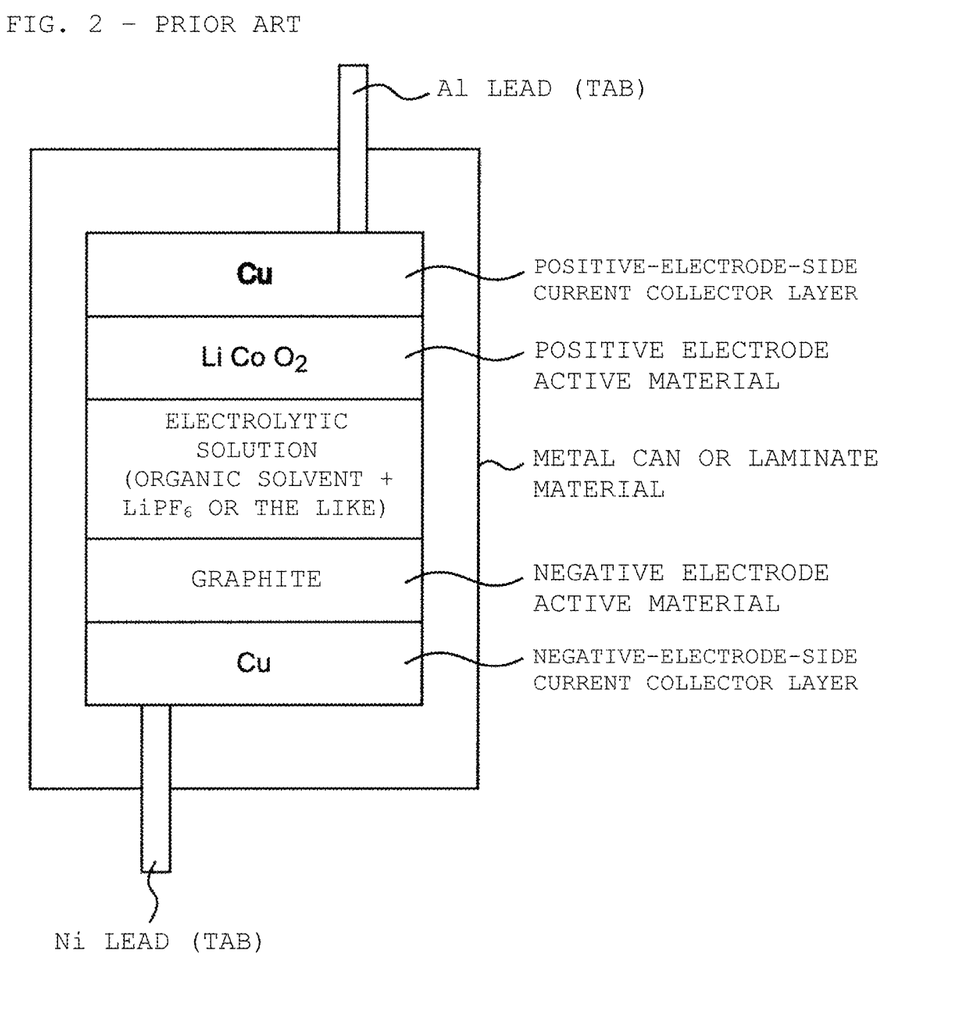
FIG. 2 is a conceptual view schematically illustrating one embodiment of an "inappropriate" secondary battery that does not function as a battery.

In such a secondary battery, when the aluminum foil (Al) (FIG. 1) as a positive-electrode-side current collector layer is changed to a copper foil (Cu) (FIG. 2), copper (Cu) is ionized and eluted as $Cu^{2+}$ or $Cu^+$, and precipitated on graphite as a negative electrode active material to cause a short circuit and lose the function as a battery, which has been recognized by those skilled in the art. That is, in the field of secondary batteries using an "electrolytic solution," it has been considered that the use of copper (Cu) as a positive-electrode-side current collector layer is "inappropriate" or "contraindicated."

Figure 3:
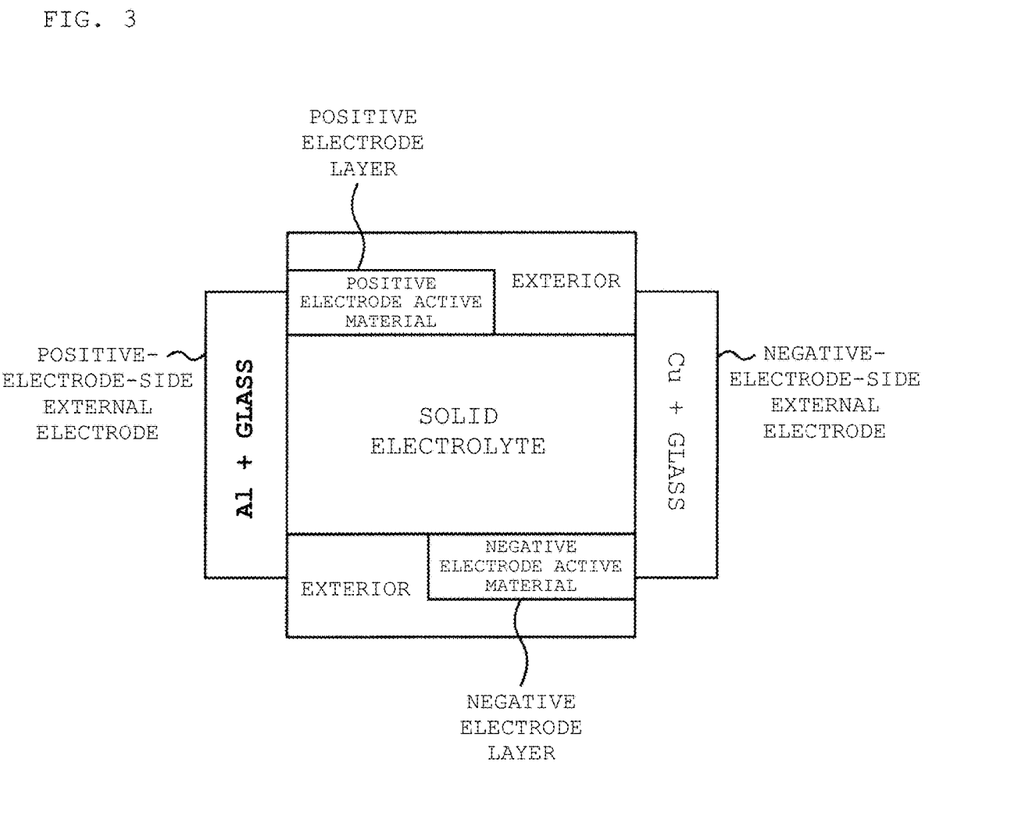
FIG. 3 is a conceptual view schematically illustrating one embodiment (failure example) of the solid-state battery.

In the secondary battery using the "electrolytic solution" described above, it has been demonstrated that aluminum (Al) is used as the positive-electrode-side current collector layer, and copper (Cu) is used as the negative-electrode-side current collector layer, thereby providing the function as a battery (refer to FIG. 1). For this reason, the inventors of the present application have investigated that in the solid-state battery (for example, a solid-state battery with a "current collection less" structure in which the electrode layer does not include a current collector layer), similarly, Al is used for the positive electrode side and Cu is used for the negative electrode side as the conductive material of the external electrode (refer to, for example, the conceptual view schematically illustrated in FIG. 3). In FIG. 3, the battery constituent unit including the positive electrode layer, the negative electrode layer, and the solid electrolyte is typically a solid battery laminate including two or more such battery constituent units; however, for convenience of explanation and simplification of description, one (single layer) battery constituent unit is described.

Herein, generally, a solid-state battery includes a solid battery laminate including a battery constituent unit including a positive electrode layer, a negative electrode layer, and a solid electrolyte interposed at least between the positive electrode layer and the negative electrode layer, and therefore the inventors of the present application considered forming such a solid battery laminate as an integrated sintered body together with or with separately an external electrode by firing.

In addition, when aluminum (Al) is used for the positive-electrode-side external electrode, for example, it has been considered to form a sintered body together with a glass component or the like (refer to, for example, the conceptual view of FIG. 3).

However, according to the research of the inventors of the present application, for example, in the firing step of the sintered body, aluminum has a low melting point of 660° C., and therefore may be melted or deformed during firing. In addition, it is known that a mixture of aluminum and an oxide may cause a significantly large exothermic reaction called thermite reaction. As described above, it has been found that aluminum is inappropriate as a material for forming the external electrode, particularly the positive-electrode-side external electrode.

The present invention has been made in view of such problems, and a main object of the present invention is to provide a solid-state battery including an external electrode more appropriately formed by firing.

Figure 4:
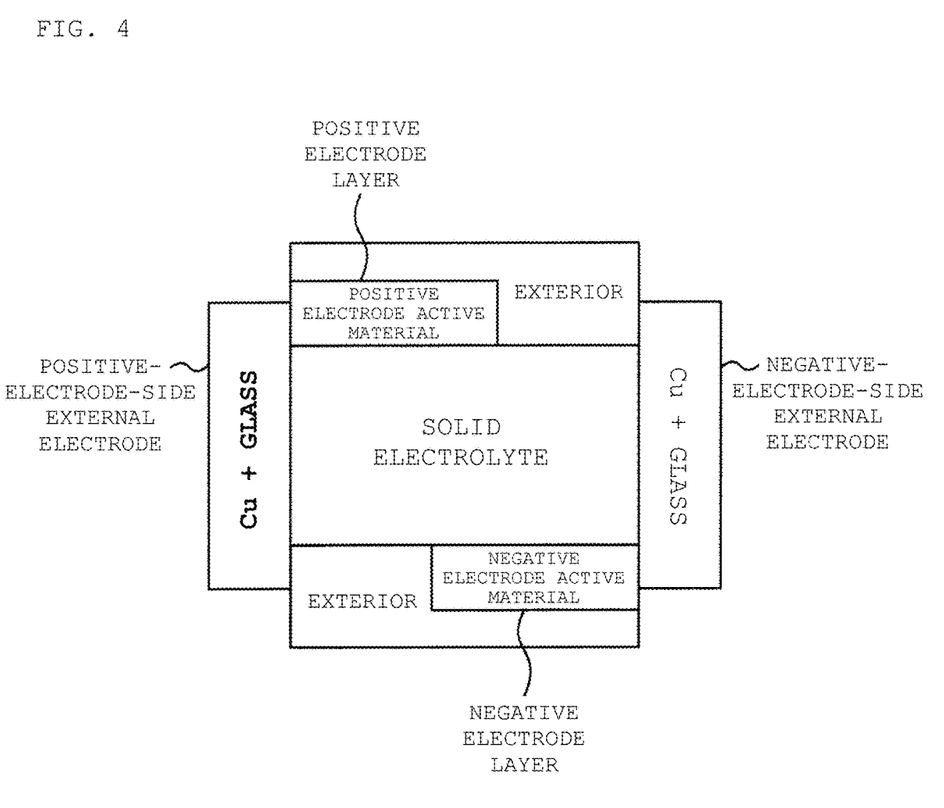
FIG. 4 is a conceptual view schematically illustrating one embodiment of the solid-state battery according to the present disclosure.

As a result of intensive investigations, the inventors of the present application have found that in the field of secondary ion batteries, particularly in the field of secondary batteries using an "electrolytic solution," intentionally using a metal such as copper (Cu), which has been considered to be "inappropriate" or "contraindicated" as a positive-electrode-side conductive material, as a component of a positive-electrode-side external electrode in the production of a solid-state battery, a solid-state battery having a small decrease in battery capacity in a charge-discharge cycle can be produced (refer to, for example, the conceptual view schematically illustrated in FIG. 4). In FIG. 4, the battery constituent unit including the positive electrode layer, the negative electrode layer, and the solid electrolyte is typically a solid battery laminate including two or more such battery constituent units; however, for convenience of explanation and simplification, one (single layer) battery constituent unit is described.

As a result, there has been completed the invention of a solid-state battery in which the above main object has been achieved.

The present invention provides a solid-state battery that includes: a solid battery laminate including a battery constituent unit including a positive electrode layer, a negative electrode layer, and a solid electrolyte interposed at least between the positive electrode layer and the negative electrode layer; a positive-electrode-side external electrode electrically connected to the positive electrode layer, the positive-electrode-side external electrode including at least one element selected from the group consisting of Cu, Ag, Ni, Ti, Cr, Pt, and Pd; and a negative-electrode-side external electrode electrically connected to the negative electrode layer.

The present invention can provide a solid-state battery including an external electrode more appropriately formed by firing.

The solid-state battery of the present disclosure can exhibit an effect such as a small decrease in battery capacity in a charge-discharge cycle.

DETAILED DESCRIPTION OF THE INVENTION

Hereinafter, the solid-state battery of the present disclosure will be described in detail. The description will be made with reference to the drawings as necessary; however, the illustrated contents are only schematically and exemplarily illustrated for the understanding of the present invention, and the appearance and the dimensional ratio for example may be different from the actual ones.

The term "sectional view" as used herein is based on a form (briefly, a form in the case of being cut along a plane parallel to the thickness direction) where an object is viewed from a direction substantially perpendicular to a thickness direction based on a laminating direction of each layer constituting the solid-state battery. The "vertical direction" and the "horizontal direction" used directly or indirectly in the present description correspond to the vertical direction and the horizontal direction in the drawings, respectively. Unless otherwise specified, the same reference numerals or symbols indicate the same members/portions or the same semantic contents. In a preferable aspect, it can be understood that the downward direction in the vertical direction (that is, the direction in which gravity acts) corresponds to the "downward direction"/"bottom surface side", and the opposite direction corresponds to the "upward direction"/"top surface side".

The term "solid-state battery" used in the present invention refers to a battery whose constituent elements are composed of a solid in a broad sense, and refers to an all-solid-state battery whose constituent elements (particularly preferably all constituent elements) are composed of a solid in a narrow sense. In a preferable aspect, the solid-state battery in the present invention is a laminated solid-state battery composed of each layer including a battery constituent unit laminated with each other, and such each layer preferably includes a sintered body. The "solid-state battery" includes not only a so-called "secondary battery" capable of repeating charging and discharging but also a "primary battery" capable of only discharging. According to a preferable aspect of the present invention, the "solid-state battery" is a secondary battery. The "secondary battery" is not excessively limited by its name, and may include, for example, a power storage device.

Hereinafter, a basic configuration of the solid-state battery according to one embodiment of the present invention will be described. The configuration of the solid-state battery described herein is merely an example for understanding the invention, and does not limit the invention.

[Basic Configuration of Solid-State Battery]

Figure 5:
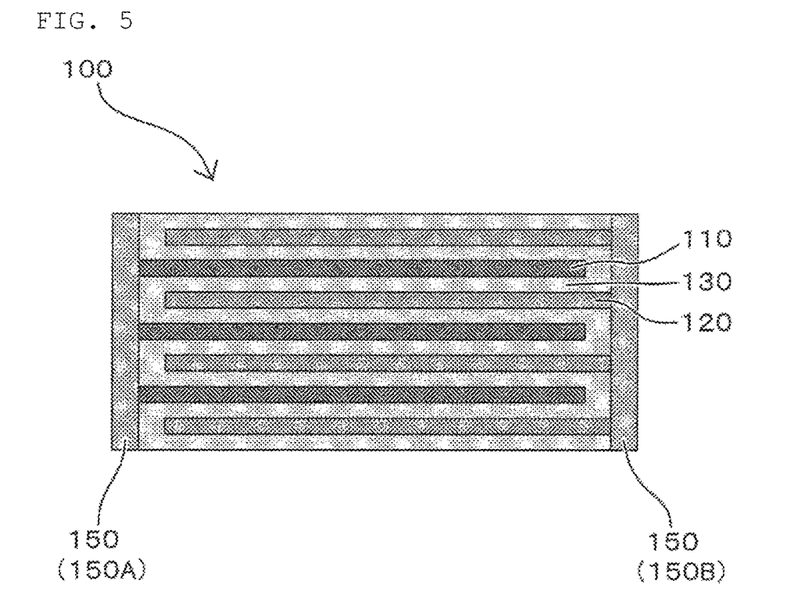
FIG. 5 is a sectional view schematically illustrating an internal configuration of the solid-state battery according to the present disclosure.

A solid-state battery at least includes electrode layers of a positive electrode layer and a negative electrode layer, and a solid electrolyte or solid electrolyte layer that can be at least interposed between the positive electrode layer and the negative electrode layer. Specifically, as shown in FIG. 5, a solid-state battery 100 includes a solid battery laminate including a battery constituent unit(s) including a positive electrode layer 110, a negative electrode layer 120, and a solid electrolyte or a solid electrolyte layer 130 that can be at least interposed therebetween.

Preferably, in the solid-state battery, each layer constituting the solid-state battery is formed by fire, and a positive electrode layer, a negative electrode layer, and a solid electrolyte include a sintered layer. More preferably, the positive electrode layer, the negative electrode layer, and the solid electrolyte layer are fired integrally with each other, and therefore the solid battery laminate includes an integrally sintered body.

The positive electrode layer 110 is an electrode layer including at least a positive electrode active material. Therefore, the positive electrode layer 110 may be a positive electrode active material layer mainly including a positive electrode active material. The positive electrode layer may further include a solid electrolyte as necessary.

In a preferable aspect, the positive electrode layer may be composed of a sintered body including at least positive electrode active material particles and solid electrolyte particles.

The negative electrode layer 120 is an electrode layer including at least a negative electrode active material. Therefore, the negative electrode layer 120 may be a negative electrode active material layer mainly including a negative electrode active material. The negative electrode layer may further include a solid electrolyte as necessary.

In an aspect, the negative electrode layer may be composed of a sintered body at least including negative electrode active material particles and solid electrolyte particles.

The positive electrode active material and the negative electrode active material are materials involved in occlusion and release of ions and transfer of electrons to and from an external circuit in a solid-state battery. Through the solid electrolyte, ions move (conduct) between the positive electrode layer and the negative electrode layer. The occlusion and release of ions into and from the active material is accompanied by oxidation or reduction of the active material, and charge and discharge proceed as electrons or holes for such oxidation-reduction reaction are transferred from an external circuit to an external electrode, and further to a positive electrode layer or a negative electrode layer. The positive electrode layer and the negative electrode layer are particularly preferably layers capable of occluding and releasing lithium ions or sodium ions. That is, the solid-state battery is preferably an all-solid-state secondary battery in which lithium ions or sodium ions can move between the positive electrode layer and the negative electrode layer with the solid electrolyte interposed therebetween to charge and discharge the battery.

(Positive Electrode Active Material)

Examples of the positive electrode active material that can be included in the positive electrode layer 110 shown in FIG. 5 include at least one selected from the group consisting of a lithium-containing phosphate compound having a NASICON-type structure, a lithium-containing phosphate compound having an olivine-type structure, a lithium-containing layered oxide, and a lithium-containing oxide having a spinel-type structure. Examples of the lithium-containing phosphate compound having a NASICON-type structure include $Li_3V_2(PO_4)_3$. Examples of the lithium-containing phosphate compound having an olivine type structure include $Li_3Fe_2(PO_4)_3$, $LiFePO_4$, $LiMnPO_4$, and/or $LiFe_{0.6}Mn_{0.4}PO_4$. Examples of the lithium-containing layered oxide include $LiCoO_2$, $LiCo_{1/3}Ni_{1/3}Mn_{1/3}O_2$, and/or $LiCo_{0.8}Ni_{0.15}Al_{0.05}O_2$. Examples of the lithium-containing oxide having a spinel-type structure include $LiMn_2O_4$ and/or $LiNi_{0.5}Mn_{1.5}O_4$.

Similarly, examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, and a sodium-containing oxide having a spinel-type structure.

(Negative Electrode Active Material)

Examples of the negative electrode active material that can be included in the negative electrode layer 120 shown in FIG. 5 include at least one selected from the group consisting of an oxide including at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, and a lithium-containing oxide having a spinel-type structure. Examples of the lithium alloy include Li—Al. Examples of the lithium-containing phosphate compound having a NASICON-type structure include $Li_3V_2(PO_4)_3$ and/or $LiTi_2(PO_4)_3$. Examples of the lithium-containing phosphate compound having an olivine type structure include $Li_3Fe_2(PO_4)_3$ and/or $LiCuPO_4$. Examples of the lithium-containing oxide having a spinel-type structure include $Li_4Ti_5O_{12}$.

Similarly, examples of the negative electrode active material capable of occluding and releasing sodium ions include at least one selected from the group consisting of a sodium-containing phosphate compound having a NASICON-type structure, a sodium-containing phosphate compound having an olivine-type structure, and a sodium-containing oxide having a spinel-type structure.

The positive electrode layer and/or the negative electrode layer may include a conductive auxiliary agent. Examples of the conductive auxiliary agent that can be included in the positive electrode layer and the negative electrode layer include at least one composed of a metal material such as silver, palladium, gold, platinum, copper, or nickel, and carbon.

Furthermore, the positive electrode layer and/or the negative electrode layer may include a sintering additive.

Examples of the sintering additive include at least one selected from the group consisting of lithium oxide, sodium oxide, potassium oxide, boron oxide, silicon oxide, bismuth oxide, and phosphorus oxide.

The thicknesses of the positive electrode layer and the negative electrode layer are not particularly limited. For example, the thicknesses of the positive electrode layer and the negative electrode layer may be each independently 2 μm to 100 μm, and particularly may be 5 μm to 50 μm.

(Solid Electrolyte)

The solid electrolyte is a material capable of conducting lithium ions or sodium ions. Particularly, the solid electrolyte that can be included in the battery constituent unit in the solid-state battery can form a layer capable of conducting lithium ions or sodium ions between the positive electrode layer and the negative electrode layer.

Specific examples of the solid electrolyte include a lithium-containing phosphate compound having a NASICON-type structure, an oxide having a perovskite-type structure, and an oxide having a garnet-type or garnet-type similar structure. Examples of the lithium-containing phosphate compound having a NASICON-type structure include $Li_xM_y(PO_4)_3$ ($1 \leq x \leq 2$, $1 \leq y \leq 2$, and M is at least one selected from the group consisting of Ti, Ge, Al, Ga, and Zr). Examples of the lithium-containing phosphate compound having a NASICON-type structure include $Li_{1.2}Al_{0.2}Ti_{1.8}(PO_4)_3$. Examples of the oxide having a perovskite-type structure include $La_{0.55}Li_{0.35}TiO_3$. Examples of the oxide having a garnet-type or garnet-type similar structure include $Li_7La_3Zr_2O_{12}$.

Similarly, examples of the solid electrolyte capable of conducting sodium ions include a sodium-containing phosphate compound having a NASICON-type structure, an oxide having a perovskite-type structure, and an oxide having a garnet-type or garnet-type similar structure. Examples of the sodium-containing phosphate compound having a NASICON-type structure include $Na_xM_y(PO_4)_3$ ($1 \leq x \leq 2$, $1 \leq y \leq 2$, and M is at least one selected from the group consisting of Ti, Ge, Al, Ga, and Zr).

The solid electrolyte layer may include, for example, a sintering additive. The sintering additive that can be included in the solid electrolyte layer may be selected from, for example, materials similar to the sintering additive that can be included in the positive electrode layer and/or the negative electrode layer.

The thickness of the solid electrolyte layer that can be positioned between the positive electrode layer and the negative electrode layer is not particularly limited. The thickness of the solid electrolyte layer may be, for example, 1 μm to 15 μm, and particularly 1 μm to 5 μm.

(Positive Electrode Current Collector Layer and Negative Electrode Current Collector Layer)

For example, the positive electrode layer 110 and the negative electrode layer 120 shown in FIG. 5 may include, for example, a positive electrode current collector layer and a negative electrode current collector layer, respectively. Each of the positive electrode current collector layer and the negative electrode current collector layer may have a form of a foil; however, may have a form of a sintered body, from the viewpoint of reducing the production cost of the solid-state battery by integral firing and reducing the internal resistance of the solid-state battery. When the positive electrode current collector layer and the negative electrode current collector layer have the form of a sintered body, for example, the positive electrode current collector layer and the negative electrode current collector layer may be composed of a sintered body including a conductive auxiliary agent and a sintering additive.

The thicknesses of the positive electrode current collector layer and the negative electrode current collector layer are not particularly limited. The thicknesses of the positive electrode current collector layer and the negative electrode current collector layer may be each independently, for example, 1 μm to 10 μm, and may be particularly 1 μm to 5 μm.

The conductive auxiliary agent that can be included in the positive electrode current collector layer and the negative electrode current collector layer may be selected from, for example, the similar materials as the conductive auxiliary agent that can be included in the positive electrode layer and the negative electrode layer. The sintering additive that can be included in the positive electrode current collector layer and the negative electrode current collector layer may be selected from, for example, the same materials as the sintering additive that can be included in the positive electrode layer and/or the negative electrode layer. In the solid-state battery, the positive electrode current collector layer and the negative electrode current collector layer are not essential, and a solid-state battery is also considered without such a positive electrode current collector layer and a negative electrode current collector layer. That is, the solid-state battery in the present invention may be a solid-state battery with a "current collection less" structure.

When the solid battery laminate forms an integrally sintered body together with external electrodes described in detail below, the solid-state battery of the present disclosure is preferably a solid-state battery with a "current collection less" structure, from the viewpoints of reduction in the production cost of the solid-state battery, safety, and reduction in the internal resistance of the solid-state battery. Metal foils and metal powders are generally known to have low resistance. However, when a metal such as Cu is introduced into the positive electrode of the solid-state battery, for example, depending on firing conditions, contents, and coexisting materials, an undesirable high resistance reaction layer may be formed with the positive electrode active material or the solid electrolyte during firing, or metal ions are solid-solved in the solid electrolyte or the positive electrode active material, which may cause a decrease in conductivity or a decrease in active material capacity.

(External Electrode)

For example, the solid-state battery 100 shown in FIG. 5 is provided with an external electrode 150. Particularly, the external electrode 150 is preferably provided as an "end electrode" on a side surface of the solid-state battery 100, preferably on an opposing side surface. More specifically, there are provided a positive-electrode-side external electrode (or end electrode) 150A electrically connected to the positive electrode layer 110 and a negative-electrode-side external electrode (or end electrode) 150B electrically connected to the negative electrode layer 120 (refer to FIG. 5). Such an external electrode preferably includes a material having high conductivity (or a conductive material).

[Features of Solid-State Battery of the Present Disclosure]

Features of the solid-state battery according to one embodiment of the present disclosure will be described in detail with reference to a conceptual view schematically shown in FIG. 6. The solid-state battery 10 according to one embodiment of the present disclosure includes a solid battery laminate including the battery constituent unit including a positive electrode layer 1, a negative electrode layer 2, and a solid electrolyte 3 that can be at least interposed between the positive electrode layer 1 and the negative electrode layer 2. The battery constituent unit including the positive electrode layer 1, the negative electrode layer 2, and the solid electrolyte 3 is typically a solid battery laminate including two or more such battery constituent units; however, for convenience of explanation and simplification of description, one (single layer) battery constituent unit is described in FIG. 6. The solid-state battery 10 further includes, as external electrodes of the solid-state battery, a positive-electrode-side external electrode 4 electrically connected to the positive electrode layer 1, and a negative-electrode-side external electrode 5 electrically connected to the negative electrode layer 2. The solid-state battery 10, the positive electrode layer 1, the negative electrode layer 2, the solid electrolyte 3, the positive-electrode-side external electrode 4, and the negative-electrode-side external electrode 5 can correspond to the solid-state battery 100, the positive electrode layer 110, the negative electrode layer 120, the solid electrolyte 130, the positive-electrode-side external electrode 150A, and the negative-electrode-side external electrode 150B as shown in FIG. 5 described above, respectively.

Particularly, the solid-state battery 10 according to one embodiment of the present disclosure is characterized by the positive-electrode-side external electrode 4 electrically connected to the positive electrode layer 1.

Specifically, the positive-electrode-side external electrode 4 includes at least one element selected from the group consisting of Cu (copper), Ag (silver), Ni (nickel), Ti (titanium), Cr (chromium), Pt (platinum), and Pd (palladium).

The positive-electrode-side external electrode 4 includes the above elements, whereby the positive-electrode-side external electrode 4 can be formed as a sintered body by, for example, firing, and a solid-state battery having a small decrease in battery capacity can be successfully produced in a charge-discharge cycle. Furthermore, the positive-electrode-side external electrode 4 includes the above elements, whereby the integrally sintered body thereof can be formed together with or separately from the positive electrode layer 1, the negative electrode layer 2, the solid electrolyte 3, and the negative-electrode-side external electrode 5 as described later, and a solid-state battery can be easily and quickly produced.

The above element is preferably at least one selected from the group consisting of Cu, Ag, Ni, and Ti, more preferably at least one selected from the group consisting of Cu and Ag, and particularly preferably Cu.

The positive-electrode-side external electrode 4 includes the above single element or the compound thereof in an amount of, for example, 30% by volume to 99% by volume, preferably 33% by volume to 95% by volume, based on the total volume of the external electrode 4. Within the above range, a solid-state battery having a small decrease in battery capacity in a charge-discharge cycle can be successfully produced. The compound of the above element is not particularly limited as long as it includes the above element.

The component other than the above that can be included in the positive-electrode-side external electrode 4 is not particularly limited, and the positive-electrode-side external electrode 4 preferably further includes a glass component. The external electrode 4 includes a glass component together with the above elements, whereby this glass component functions as a base material, and therefore the adhesiveness with the solid-state battery is improved, and the charge-discharge cycle can be further improved.

In addition, the above single element or compound thereof can be appropriately dispersed in the external electrode 4 by the glass component that can be included in the positive-electrode-side external electrode 4.

The external electrode 4 including such a glass component is preferable, because the sintered body thereof can be obtained by firing.

The glass component may be included in the external electrode 4 in an amount of, for example, 1% by volume to 70% by volume, preferably 5% by volume to 67% by volume, based on the total volume of the positive-electrode-side external electrode 4 (however, in the positive-electrode-side external electrode 4, the total of the glass component and the above single element or the compound thereof does not exceed 100% by volume). Within the above range, a solid-state battery having a small decrease in battery capacity in a charge-discharge cycle can be successfully produced.

The glass component may include, for example, at least one selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass. Of these, borosilicate glass is preferably used.

The positive-electrode-side external electrode 4 may further include a ceramic component as necessary. Examples of the ceramic component include those including at least one selected from the group consisting of alumina, zirconia, spinel, and forsterite.

The positive-electrode-side external electrode 4 includes the above elements, and therefore can be sintered by, for example, firing, and preferably includes a sintered body. More preferably, the external electrode 4 is formed as a sintered body.

When the external electrode 4 is formed as a sintered body, a conventional electrode forming step such as sputtering can be omitted. In addition, in the firing step, there is no risk of melting of the above elements or strong heat generation, and a solid-state battery having a small decrease in battery capacity can be successfully produced in a charge-discharge cycle.

The sintered body of the positive-electrode-side external electrode 4 preferably includes, of the above elements, a Cu component, specifically a single element of Cu or a compound thereof, or an Ag component, specifically a single element of Ag or a compound thereof, and the above glass component. Using such a sintered body of the external electrode 4 can provide a solid-state battery having a small decrease in battery capacity in a charge-discharge cycle.

Hereinafter, other features of the solid-state battery 10 according to one embodiment of the present disclosure will be described in detail (refer to FIG. 6).

The negative-electrode-side external electrode 5 includes at least one element selected from the group consisting of Cu (copper), Ag (silver), Ni (nickel), Ti (titanium), Cr (chromium), Pt (platinum), and Pd (palladium).

The negative-electrode-side external electrode 5 includes the above elements, whereby the negative-electrode-side external electrode 5 can be formed as a sintered body by, for example, firing, and is combined with the positive-electrode-side external electrode 4, whereby a solid-state battery having a small decrease in battery capacity can be successfully produced in a charge-discharge cycle. Furthermore, the negative-electrode-side external electrode 5 includes the above elements, whereby the integrally sintered body thereof can be formed together with or separately from the positive electrode layer 1, the negative electrode layer 2, the solid electrolyte 3, and the positive-electrode-side external electrode 4 as described above, and a solid-state battery can be easily and quickly produced.

The above element is preferably at least one selected from the group consisting of Cu, Ag, and Ni, and more preferably Cu.

The negative-electrode-side external electrode 5 includes the above single element or the compound thereof in an amount of, for example, 30% by volume to 99% by volume, based on the total volume of the external electrode 5. Within the above range, combining with the positive-electrode-side external electrode 4 can successfully produce a solid-state battery having a small decrease in battery capacity in a charge-discharge cycle. The compound of the above element is not particularly limited as long as it includes the above element.

The component other than the above that can be included in the negative-electrode-side external electrode 5 is not particularly limited, and the negative-electrode-side external electrode 5 preferably further includes a glass component.

The negative-electrode-side external electrode 5 includes a glass component, whereby this glass component serves as a base material, and there can be formed the external electrode 5 obtained by appropriately dispersing the above single element or the compound thereof therein. The external electrode 5 including such a glass component is preferable, because the sintered body thereof can be obtained by firing.

The glass component may be included in the external electrode 5 in an amount of, for example, 1% by volume to 70% by volume, based on the total volume of the negative-electrode-side external electrode 5 (however, in the negative-electrode-side external electrode 5, the total of the glass component and the above single element or the compound thereof does not exceed 100% by volume). Within the above range, combining with the positive-electrode-side external electrode 4 can successfully produce a solid-state battery having a small decrease in battery capacity in a charge-discharge cycle.

The glass component may include, for example, at least one selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass. Of these, borosilicate glass is preferably used.

The negative-electrode-side external electrode 5 may further include a ceramic component as necessary. Examples of the ceramic component include those including at least one selected from the group consisting of alumina, zirconia, spinel, and forsterite.

The negative-electrode-side external electrode 5 includes the above elements, and therefore can be sintered by, for example, firing, and preferably includes a sintered body. More preferably, the external electrode 5 is formed as a sintered body.

The sintered body of the negative-electrode-side external electrode 5 preferably includes a Cu component, specifically, a single element of Cu or the compound thereof, and the glass component. Using such a sintered body of the external electrode 5 in combination with the positive-electrode-side external electrode 4 can provide a solid-state battery having a small decrease in battery capacity in a charge-discharge cycle.

The positive-electrode-side external electrode 4 and the negative-electrode-side external electrode 5 may be used in any combination. For example, the positive-electrode-side external electrode 4 composed of a sintered body and the negative-electrode-side external electrode 5 composed of a sintered body are preferably used in combination. Particularly, both the positive electrode side and the negative electrode side are preferably external electrodes composed of the sintered body including a Cu component, specifically, a single element of Cu or the compound thereof, and the glass component.

In the solid-state battery 10, all of the battery constituent unit including the positive electrode layer 1, the negative electrode layer 2, and the solid electrolyte 3 that can be at least interposed between the positive electrode layer 1 and the negative electrode layer 2, particularly a solid battery laminate including a plurality of battery constituent units, the positive-electrode-side external electrode 4, and the negative-electrode-side external electrode 5 are preferably sintered bodies, and these are particularly preferably integrally sintered bodies.

In the present invention, as described above, the positive-electrode-side external electrode 4 includes at least one element selected from the group consisting of Cu (copper), Ag (silver), Ni (nickel), Ti (titanium), Cr (chromium), Pt (platinum), and Pd (palladium). As a result, although the solid battery laminate and the external electrode are formed into an integrally sintered body, there is no risk of melting of the metal of the above element and strong heat generation in the firing step, and the solid-state battery can be successfully produced simply and quickly. In addition, the solid-state battery thus produced can exhibit an unexpected remarkable effect such as a small decrease in battery capacity in a charge-discharge cycle.

Herein, in the solid-state battery 10 according to one embodiment of the present disclosure, desirably, each of the two electrode layers, that is, the positive electrode layer 1 and the negative electrode layer 2, have a current collection less structure without a current collector layer. Such a current collection less structure not only allows the production of the solid-state battery to be simpler, but also the risk of melting of the metal and strong heat generation to be further reduced, for example, in the firing step.

In addition, in the solid-state battery 10, the positive electrode layer 1 and the negative electrode layer 2 are layers capable of occluding and releasing lithium ions or sodium ions. The positive electrode layer 1 and the negative electrode layer 2 are preferably composed of the above positive electrode active material and negative electrode active material, respectively, and at least one of them is particularly preferably composed of $Li_3V_2(PO_4)_3$.

Furthermore, in the solid-state battery 10, a conductive layer including carbon or a conductive oxide may be interposed between the positive electrode layer 1 and the external electrode 4 in an electrically connected, preferably electrically contacted state.

The positive electrode layer exhibits strong oxidizing property by charging, which may cause an undesirable reaction with the external electrode material in contact with thereof. In the present disclosure, as described above, the contact area between the external electrode and the positive electrode layer is set as small as possible without impairing the conductivity of bonding (FIG. 6). This can minimize such an undesirable reaction. Furthermore, using the conductive layer including carbon or a conductive oxide can prevent the positive electrode layer having strong oxidizing properties from being in direct contact with the external electrode while maintaining conductivity. That is, an undesirable reaction can be prevented. Furthermore, the conductive layer has a buffering action, and can also relieve physical forces such as stress applied to the positive electrode layer 1 and/or the external electrode 4. Such a conductive layer may be interposed between the negative electrode layer 2 and the external electrode 5.

The conductive oxide is not particularly limited as long as it has conductivity.

[Method for Producing Solid-State Battery]

The solid-state battery of the present disclosure can be produced by, for example, a green sheet method using a green sheet, or a printing method such as screen printing. Hereinafter, the production method by the green sheet method using a green sheet will be exemplarily described; however, the method for producing the solid-state battery of the present disclosure is not limited thereto, and a predetermined laminate or the like may be formed by, for example, a screen printing method and a method combining a screen printing method and a green sheet method.

(Step of Forming Unfired Laminate)

There are applied onto each substrate (for example, a PET film) used as a supporting substrate a solid electrolyte layer paste, a positive electrode layer (or positive electrode active material layer) paste, a positive electrode current collector layer paste (optional), a negative electrode layer (or negative electrode active material layer) paste, a negative electrode current collector layer paste (optional), an exterior paste (or protective layer or outermost layer paste) (optional), a positive-electrode-side external electrode paste, and a negative-electrode-side external electrode paste.

Each paste can be prepared, for example, by wet-mixing a predetermined constituent material of each layer appropriately selected from the group consisting of a positive electrode active material, a negative electrode active material, a conductive material, a solid electrolyte material, an insulating material, a conductive auxiliary agent, and a sintering additive, and an organic vehicle in which an organic material is dissolved in a solvent.

The positive electrode layer paste includes, for example, a positive electrode active material, an electron conductive material, a solid electrolyte material, an organic material, and a solvent.

The negative electrode layer paste includes, for example, a negative electrode active material, an electron conductive material, a solid electrolyte material, an organic material, and a solvent.

The paste for the solid electrolyte layer includes, for example, a solid electrolyte material, a sintering additive, an organic material, and a solvent.

The positive electrode current collector layer paste (optional) or negative electrode current collector layer paste (optional) may be, for example, at least one selected from the group consisting of Ag (silver), Pr (palladium), Au (gold), Pt (platinum), Al (aluminum), Cu (copper), and Ni (nickel).

The exterior paste (optional) includes, for example, an insulating material, an organic material, and a solvent.

The positive-electrode-side external electrode paste includes, for example, a conductive material, a glass material, an organic material, and a solvent.

The negative-electrode-side external electrode paste includes, for example, a conductive material, a glass material, an organic material, and a solvent.

In the wet-mixing, a medium can be used, and specifically, for example, a ball mill method and a visco mill method can be used. Whereas, a wet-mixing method without using a medium may be used, and for example, a sand mill method, a high-pressure homogenizer method, and a kneader dispersion method may be used.

The supporting substrate is not particularly limited as long as it can support the unfired laminate, and for example, a substrate composed of a polymer material such as polyethylene terephthalate can be used. When the unfired laminate is subjected to the firing step while being held on the substrate, the substrate having heat resistance to a firing temperature may be used.

As described above, examples of the solid electrolyte material included in the solid electrolyte layer paste may include a powder composed of a lithium-containing phosphate compound having a NASICON-type structure, a sodium-containing phosphate compound having a NASICON-type structure, an oxide having a perovskite-type structure, and/or an oxide having a garnet-type or garnet-type similar structure.

Examples of the positive electrode active material that can be included in the positive electrode layer (or positive electrode active material layer) paste may include at least one selected from the group consisting of a lithium-containing phosphate compound having a NASICON-type structure, a lithium-containing phosphate compound having an olivine-type structure, a lithium-containing layered oxide, and a lithium-containing oxide having a spinel-type structure. In addition, examples of the positive electrode active material capable of occluding and releasing sodium ions may include at least one selected from the group consisting of a sodium-containing phosphate compound having a NASICON-type structure, a sodium-containing phosphate compound having an olivine-type structure, a sodium-containing layered oxide, and a sodium-containing oxide having a spinel-type structure.

Examples of the negative electrode active material that can be included in the negative electrode layer (or negative electrode active material layer) paste may include at least one selected from the group consisting of an oxide including at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, and a lithium-containing oxide having a spinel-type structure. In addition, examples of the negative electrode active material capable of occluding and releasing sodium ions may include at least one selected from the group consisting of a sodium-containing phosphate compound having a NASICON-type structure, a sodium-containing phosphate compound having an olivine-type structure, and a sodium-containing oxide having a spinel-type structure.

In addition to the positive electrode active material and the negative electrode active material, the positive electrode layer paste and the negative electrode layer paste may include, for example, a material that can be included in the solid electrolyte paste, and/or an electron conductive material.

Examples of the insulating material that can be included in the exterior (or protective layer or outermost layer) paste may include at least one selected from the group consisting of a glass material, a ceramic material, a thermosetting resin material, and a photocurable resin material. The exterior that can be formed of the exterior paste can cover the solid electrolyte layer, the positive electrode layer, and/or the negative electrode layer.

The conductive material that can be included in the positive-electrode-side external electrode paste may be a powder of a metal or an alloy including at least one element selected from the group consisting of Cu, Ag, Ni, Ti, Cr, Pt, and Pd. The glass material that can be included in the positive-electrode-side external electrode paste may be at least one powder selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass.

The conductive material that can be included in the negative-electrode-side external electrode paste may be a powder of a metal or an alloy including at least one element selected from the group consisting of Cu, Ag, Ni, Ti, Cr, Pt, and Pd. The glass material that can be included in the negative-electrode-side external electrode paste may be at least one powder selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass.

The organic material that can be included in the paste used for producing a solid-state battery is not particularly limited, and there can be used at least one polymer material selected from the group consisting of a polyvinyl acetal resin, a cellulose resin, a polyacrylic resin, a polyurethane resin, a polyvinyl acetate resin, and a polyvinyl alcohol resin.

The paste may include a solvent. Such a solvent is not particularly limited as long as the organic material can be dissolved, and for example, toluene and/or ethanol may be used.

Examples of the conductive auxiliary agent may include at least one composed of metal materials such as silver, palladium, gold, platinum, copper, and nickel, and carbon.

Examples of the sintering additive may include at least one selected from the group consisting of lithium oxide, sodium oxide, potassium oxide, boron oxide, silicon oxide, bismuth oxide, and phosphorus oxide.

Each paste applied onto a substrate (for example, a PET film) is dried on a hot plate heated to a temperature of 30° C. to 50° C. to form a solid electrolyte layer sheet, a positive electrode layer sheet and a negative electrode layer sheet, a positive electrode current collector layer sheet (optional), a negative electrode current collector layer sheet (optional), an exterior (or protective layer or outermost layer) sheet (optional), a positive-electrode-side external electrode sheet, and a negative-electrode-side external electrode sheet each having a predetermined thickness on the substrate.

Then, each sheet is peeled off from the substrate. After the peeling, the sheet of each constituent element of each battery constituent unit is sequentially laminated along the lamination direction. As necessary, an exterior (or protective layer or outermost layer) sheet may be appropriately laminated at an appropriate timing (preferably, may be laminated as a first layer and/or a final layer). Then, thermocompression bonding at a predetermined pressure (for example, about 50 MPa to about 100 MPa) and subsequent isotropic pressing at a predetermined pressure (for example, about 150 MPa to about 300 MPa) may be performed. As described above, a predetermined laminate can be formed.

The predetermined laminate formed above may be cut to an appropriate dimension as necessary.

The positive-electrode-side and negative-electrode-side external electrode sheets are each peeled off from the substrate, and the corresponding external electrode sheets are disposed on the end surfaces of the laminate where the positive electrode layer and the negative electrode layer are exposed.

Alternatively, the external electrode may be formed as a precursor (or a preform) on the laminate by printing, particularly screen printing, using the positive-electrode-side and negative-electrode-side external electrode pastes.

(Firing Step)

In the firing step, the unfired laminate is subjected to firing. Although it is merely an example, the firing may be performed by removing the organic material in a nitrogen gas atmosphere containing oxygen gas or in the atmosphere, for example, at 500° C., and then by heating the unfired laminate in a nitrogen gas atmosphere or in the atmosphere, for example, at 550° C. to 1000° C. The firing may be performed while pressurizing the unfired laminate in the lamination direction (in some cases, the lamination direction and a direction perpendicular to the lamination direction).

As described above, the positive-electrode-side and negative-electrode-side external electrodes can be produced as an integrally sintered body by the firing step together with the solid battery laminate. Particularly, the positive-electrode-side external electrode includes "at least one element selected from the group consisting of Cu, Ag, Ni, Ti, Cr, Pt, and Pd", thereby allowing easily producing a solid-state battery as an integrally sintered body while avoiding, for example, melting of metal and an undesired reaction. Such a production method can provide a solid-state battery having a further improved charge-discharge cycle.

Figure 6:
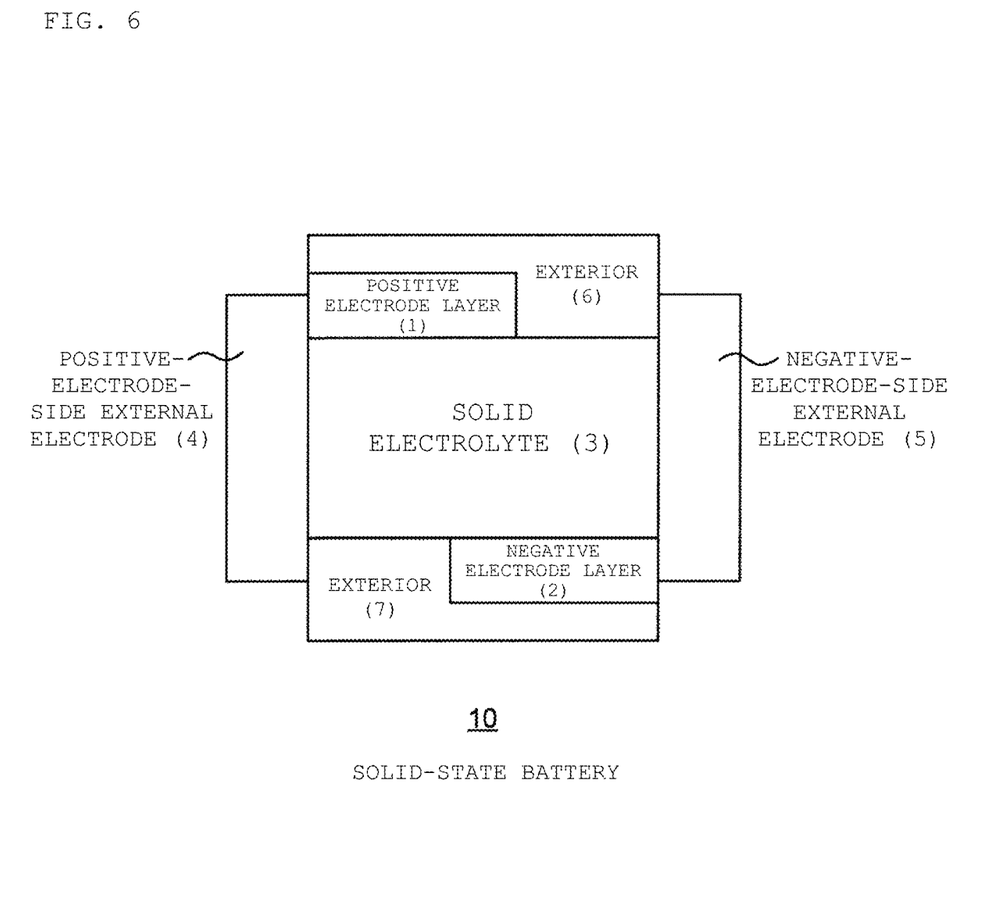
FIG. 6 is a conceptual view for explaining features of the solid-state battery according to the present disclosure.

In addition, as shown in FIG. 6, the contact area between the positive-electrode-side and negative-electrode-side external electrodes and the positive electrode layer and the negative electrode layer can be reduced, and therefore the deactivation amount due to resistance can also be reduced. In this case, the exterior may cover the end surfaces of the positive electrode layer and the negative electrode layer.

Hereinafter, the solid-state battery of the present disclosure will be described in more detail with reference to examples and comparative examples.

EXAMPLES

In accordance with the present disclosure, there was produced laminated solid-state batteries having external electrodes on both the positive electrode side and the negative electrode side, each of the external electrodes including a conductive material (element) shown in Table 1 below and borosilicate glass as a glass component (Examples 1 to 7 and Comparative Examples 1 to 5).

Experiment 1) Measurement of Discharge Capacity Ratio

A battery was charged at 25° C. and a constant voltage and constant current charge at 1 C and 2.5 V for 3 hours, and then discharged at a constant current to 0.5 V.

The capacity in discharging at 0.1 C was defined as a 0.1 C discharge capacity, and the capacity in discharging at 3 C was defined as a 3 C discharge capacity.

The percent of the 3 C discharge capacity to the 0.1 C discharge capacity (discharge capacity ratio 3 C/0.1 C (%)) is shown in Table 1 below.

The value of 3 C/0.1 C (%) is lower in a battery having a problem in high resistance or electrode reaction rate.

All of the solid-state batteries of Examples 1 to 7 had a high discharge capacity ratio of 3 C/0.1 C (%) (60% or more), and were found to be excellent as a solid-state battery.

Experiment 2) Measurement of 100° C. Cycle Characteristics

In order to evaluate the long-term reliability of the external electrode of the solid-state battery, charge and discharge were performed 500 times at 100° C. under the same charge and discharge conditions (discharge 3C) as in Experiment 1, and the ratio of the 500th discharge capacity to the second discharge capacity (capacity retention ratio, 500th capacity/second capacity) was shown in Table 1 below. The value closer to 100 indicates an excellent solid-state battery in which the discharge capacity is maintained for a long period of time.

All of the solid-state batteries of Examples 1 to 7 exhibited excellent discharge capacity characteristics over a long period of time (capacity retention ratio (500th capacity/second capacity), 85% or more).

TABLE 1

|  | Element Type | % by volume of conductive material in external electrode | Discharge capacity ratio 3 C/ 0.1 C | After 500 cycles at 100° C. | |
|---|---|---|---|---|---|
|  |  |  |  | Capacity retention ratio (500th capacity/2nd capacity) | Appearance |
| Example 1 | Cu | 30% | 60% | 85% | No abnormality |
| Example 2 | Cu | 35% | 63% | 91% | No abnormality |
| Example 3 | Cu | 50% | 66% | 93% | No abnormality |
| Example 4 | Cu | 80% | 68% | 94% | No abnormality |

TABLE 1-continued

|  | Element Type | % by volume of conductive material in external electrode | Discharge capacity ratio 3 C/ 0.1 C | After 500 cycles at 100° C. | |
|---|---|---|---|---|---|
|  |  |  |  | Capacity retention ratio (500th capacity/2nd capacity) | Appearance |
| Example 5 | Cu | 95% | 72% | 90% | No abnormality |
| Example 6 | Cu | 99% | 71% | 86% | No abnormality |
| Example 7 | Ag | 80% | 60% | 90% | No abnormality |
| Comparative Example 1 | Fe | 80% | 34% | 35% | Abnormal |
| Comparative Example 2 | C | 95% | External electrode collapse | X | X |
| Comparative Example 3 | W | 80% | 30% Large voltage drop during discharge (high cell resistance) | 33% | No abnormality |
| Comparative Example 4 | Mo | 80% | 15% Large voltage drop during discharge (high cell resistance) | 12% | No abnormality |
| Comparative Example 5 | Sn | 80% | External electrode collapse/melted large particles of Sn | X | X |

In the table, "abnormal" indicates that the surface of the solid-state battery was deformed or discolored. In addition, the symbol "x" in the table indicates that the charge-and-discharge test was not able to be performed.

From the results of Experiments 1 and 2 described above, it was found that in the solid-state batteries of Comparative Examples 1 to 5, the value of the 3 C/0.1 C discharge capacity ratio was low due to the high resistance, collapse occurred due to insufficient adhesiveness or structure maintainability of the sintered body to the solid-state battery, or the melting point of the metal was low with respect to the firing temperature and thus melted and large particles were generated, whereby the external electrode structure was not able to be maintained. In addition, it was also found that although charge and discharge can be performed, capacity deterioration was significant at 500 cycles of charge and discharge.

Thus, it has been demonstrated that the solid-state battery according to the present disclosure has a small decrease in battery capacity during the charge cycle.

The solid-state battery of the present disclosure has been described; however, only typical examples have been illustrated. Therefore, those skilled in the art will easily understand that the present invention is not limited thereto, and various aspects are conceivable without changing the gist of the present invention.

The solid-state battery of the present disclosure can be used in various fields where battery use and electric storage are assumed. Although examples are only illustrated, the solid-state battery of the present disclosure can be used in the field of electronics packaging. In addition, the solid-state battery of the present disclosure can be used in, for example, electric/information/communication fields where electric/electronic devices are used (for example, electric and electronic equipment fields or mobile equipment fields including mobile phones, smartphones, notebook computers and digital cameras, activity meters, arm computers, electronic paper, wearable devices, RFID tags, card-type electronic money, and small electronic machines such as smartwatches); household and small industrial applications (for example, the fields of electric tools, golf carts, and home, nursing, and industrial robots); large industrial applications (for example, fields of forklift, elevator, and harbor crane); transportation systems field (for example, the field of hybrid vehicles, electric vehicles, buses, trains, power-assisted bicycles, and electric two-wheeled vehicles); power system applications (for example, fields such as various types of power generation, road conditioners, smart grids, and household power storage systems); medical applications (the field of medical devices such as earphone hearing aids); pharmaceutical applications (fields such as dosage management systems); IoT fields; and space and deep sea applications (for example, fields such as a space probe and a research submarine).

DESCRIPTION OF REFERENCE SYMBOLS

1: Positive electrode layer
2: Negative electrode layer
3: Solid electrolyte
4: Positive-electrode-side external electrode
5: Negative-electrode-side external electrode
6, 7: Exterior (or protective layer or outermost layer)
10, 100: Solid-state battery
110: Positive electrode layer
120: Negative electrode layer
130: Solid electrolyte
150: External electrode (or end electrode)
150A: Positive-electrode-side external electrode (or end electrode)
150B: Negative-electrode-side external electrode (or end electrode)

The invention claimed is:

1. A solid-state battery comprising:
a solid battery laminate including a battery constituent unit including a positive electrode layer, a negative electrode layer, and a solid electrolyte interposed at least between the positive electrode layer and the negative electrode layer;
a positive-electrode-side external electrode electrically connected to the positive electrode layer, the positive-electrode-side external electrode including at least one element selected from the group consisting of Cu, Ag, Ni, Ti, Cr, Pt, and Pd; and a negative-electrode-side external electrode electrically connected to the negative electrode layer, wherein the positive-electrode-side external electrode includes the at least one element, or a compound thereof, in an amount of 30% by volume to 99% by volume based on a total volume of the positive-electrode-side external electrode.

2. The solid-state battery according to claim 1, wherein the positive electrode layer and the negative electrode layer each has a current collection less structure including no current collection layer.

3. The solid-state battery according to claim 1, wherein the at least one element is at least one selected from the group consisting of Cu, Ag, Ni, and Ti.

4. The solid-state battery according to claim 1, wherein the positive-electrode-side external electrode further includes a glass component.

5. The solid-state battery according to claim 4, wherein the positive-electrode-side external electrode includes the glass component in an amount of 1% by volume to 70% by volume based on a total volume of the positive-electrode-side external electrode.

6. The solid-state battery according to claim 4, wherein the glass component is at least one selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass.

7. The solid-state battery according to claim 1, wherein the positive-electrode-side external electrode includes a sintered body.

8. The solid-state battery according to claim 7, wherein the sintered body of the positive-electrode-side external electrode includes a Cu component or an Ag component, and a glass component.

9. The solid-state battery according to claim 1, wherein the solid battery laminate and the positive-electrode-side external electrode are integrally sintered bodies.

10. The solid-state battery according to claim 1, further comprising a conductive layer including carbon or a conductive oxide interposed between the positive electrode layer and the positive-electrode-side external electrode.

11. The solid-state battery according to claim 1, wherein the negative-electrode-side external electrode includes at least one element selected from the group consisting of Cu, Ag, Ni, Ti, Cr, Pt, and Pd.

12. The solid-state battery according to claim 11, wherein the negative-electrode-side external electrode includes a glass component in an amount of 1% by volume to 70% by volume based on a total volume of the negative-electrode-side external electrode.

13. The solid-state battery according to claim 12, wherein the glass component is at least one selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass.

14. The solid-state battery according to claim 11, wherein the solid battery laminate, the positive-electrode-side external electrode, and the negative-electrode-side external electrode are integrally sintered bodies.

15. The solid-state battery according to claim 1, wherein the positive electrode layer and the negative electrode layer are layers constructed to occlude and release lithium ions or sodium ions.

* * * * *